UNITED STATES PATENT OFFICE.

CLARE H. HALL, OF MILWAUKEE, WISCONSIN, ASSIGNOR TO CORONA CHEMICAL COMPANY, OF MILWAUKEE, WISCONSIN, A CORPORATION OF WISCONSIN.

ACID ARSENATE OF LEAD.

1,064,639.

No Drawing.

Specification of Letters Patent. Patented June 10, 1913.

Application filed March 1, 1913. Serial No. 751,465.

*To all whom it may concern:*

Be it known that I, CLARE H. HALL, a citizen of the United States, residing at Milwaukee, in the county of Milwaukee and State of Wisconsin, have invented a new and useful Improvement in Acid Arsenate of Lead, of which the following is a specification.

My invention consists in a novel material which is chemically acid arsenate of lead ($PbHAsO_4$) having certain novel and valuable physical properties particularly suiting it for use as an insecticide.

Acid arsenate of lead, when used as an insecticide, is mixed with a relatively large quantity of water, usually 1 part of the acid arsenate to 400 parts of water by weight, and the physical mixture thus formed is sprayed upon the plants to be treated. Since the acid arsenate of lead is practically insoluble, the resultant mass is simply a physical mixture, and it is of the utmost importance when using it that the acid arsenate of lead be of such physical consistency as to remain suspended in the liquid, without substantial settling, during the period which will be occupied by the spraying.

The acid arsenate of lead has heretofore been made by precipitating from one or another of the various combinations of salts which will produce it, and the resultant mass has been treated in a filter press to form a pulp. In most cases, this pulp is the commercial product, the pressure being such as to leave about 50 per cent. of water by weight in the mass. In some cases, this pulp has been dried and pulverized, the dry acid arsenate of lead being sold in the form added to and stirred in the requisite amount of powder. In use, both products have been of water.

It has been found that the drying and pulverizing of the pulp, in practically every case, greatly increases its settling tendency, and, for that reason, prior to my invention, the pulp has been in greatest demand. The pulp, however, has certain important disadvantages. In the first place, the expense of packing and shipping, as compared with packing and shipping the dry product, is considerable. In the second place, the pulp in the hands of the consumer or middleman frequently dries out into a cake which can not be mixed with water and which is therefore useless. In the third place, there are very stringent Federal requirements as to the percentage of water permitted in the pulp, and from the manufacturing point of view it is an exceedingly difficult matter to maintain the percentage constant, so that one part of a given batch may have 55 per cent. water, while another has 45 per cent., with the result that the manufacturer may unwittingly subject himself to criminal prosecution. In spite of these disadvantages, however, the superior suspension properties of the pulp have led to its being the most popular form of acid arsenate of lead. I have succeeded, however, in producing a dry arsenate of lead of the composition $PbHAsO_4$ which remains in suspension in water as well as any of the pulps heretofore manufactured and far better than any of the dry material of similar chemical composition. The difference in this property is of course caused by a difference in physical constitution, and the material is obtained by employing several steps which coöperate to this end.

As a first step, it is desirable that the material be thrown down in the form of the most minute possible particles, and this result can be produced by using extremely dilute solutions of the reacting salts; as, for instance, sodium acid arsenate, $Na_2HAsO_4$, and lead nitrate, $Pb(NO_3)_2$, the nitrate of lead being formed in a solution of 1 part of nitrate of lead to 150 parts of water, and the sodium acid arsenate being introduced in a relatively strong solution, say 1 part to 10 parts of water and at slow speed. The precipitate thus formed is so fine and flocculent as to make it a matter of some difficulty to press it to the dryness at which commercial pulps are regularly sold. This fine precipitate is pressed in the filter press to what is known as a 35–37 per cent. pulp, that is, a pulp in which the solid matter is by weight approximately 35 per cent. and the water approximately 65 per cent. of the cake. The cake is ejected from the filter press, dried, and pulverized in a pulverizer of the disintegrator type, after it has been broken up into pieces of a convenient size—say pieces which will pass an inch mesh. The resultant material is a fine, exceedingly light powder. While the dry bulk of the material, uncompressed, has little relation with the important quality of the length of time it will remain suspended in water, it may be stated as a fact, for purposes of identification, that the present product has, in fact, a rather high dry bulk, about 100 cubic inches or more to the pound, and this is a considerably larger dry bulk than that of the other dried products now available. It will be understood, of course, that this dry material can be compressed somewhat in packing, and the foregoing figure has reference merely to its unpressed condition as it emerges from the pulverizer in marketable condition.

The most distinctive and important quality of the present material lies in its capacity for remaining suspended in water, in which it far excels all other dry materials now available. Since there is no recognized standard for determining or measuring this quality, I have devised a test to which I have submitted the various forms of acid arsenate of lead available, which test is performed in the following manner: In this test 15 grams of the arsenate of lead is pulped with water and diluted until the total volume is 250 c. c., the mixture being performed in a cylindrical glass graduate of this capacity and with a diameter of approximately 1½ inches. As the temperature of the water has a decided influence on the settlement, a temperature of very close to 15° C. has been used. The density of warm water being much less than cold, the settlement is noticeably faster at temperatures above 15° C. and noticeably slower at temperatures below 15° C. The acid arsenate of lead of course begins to settle, and after a short time a distinct space of clear water can be seen above, the lower part of the graduate remaining full of the white opaque mixture. In making the test which I have devised, the location of the line of separation between the clear water and the mixture is observed at intervals, and I have learned that my product settles in the following manner: At the end of 5 minutes, the line of separation is at 210 c. c. mark, at the end of 10 minutes, at 175 c. c., at the end of 1 hour, 92 c. c., at the end of 24 hours, 68 c. c., this last figure representing practically final settlement. I have tested samples of the materials on the market in dry form (with the exception of one or two of which I was unable to obtain samples), and I have also tested the various commercial pulps by first drying and then pulverizing the same, and I have also made similar tests on the pulps in their commercial condition. The foregoing rate of settlement is as slow as that of any of the pulps, and it far exceeds that of any of the dry materials available. For practical purposes, manifestly the rate of settlement during the first 10 minutes is the important point, and although the rates of settlement of the different materials in the main correspond, I have discovered some instances where materials settle relatively slowly during the first 10 minutes and relatively fast thereafter. However, my material not only settles slower, but settles much slower during the first 10 minutes than any of the dry products available. In fact, the slowest settlement which I discovered with a dry product was 165 at the end of 5 minutes, and 105 at the end of 10 minutes, and the largest final settlement which I observed was 45 at the end of 24 hours, as against 68 for my product.

It is thus evident that my product, while chemically the same as other materials sold for the purpose, has radical differences in its physical form, which differences are readily distinguishable by the simple settling test above outlined. It is also a fact that this physical test is directed immediately at the single quality of greatest utility in practice.

It will be understood by those skilled in the art that there are two well-known forms of lead arsenate—the acid arsenate which I have described, and the neutral arsenate, $Pb_3(AsO_4)_2$, and there is, in addition, an intermediate substance which may be a true chemical compound or may be a mixture. These various products are marketed in accordance with the percentage of arsenic which they contain, these percentages being, roughly, 33, 28 and 25 for the acid, the intermediate and the neutral arsenate. As a general proposition, the intermediate and the neutral arsenates settle more rapidly because of their higher specific gravity.

The present invention has reference only to the acid arsenate as described, but it is to be understood that I intend to cover the same commercial material whether it have mixed with it a certain percentage of the materials low in arsenic or not.

I claim as new and desire to secure by Letters Patent—

1. The herein-described dry, soft, white bulky powder essentially acid arsenate of lead ($PbHAsO_4$) distinguished by the fact that when mixed with water in the percentage of 15 grams to a total volume of 250 c. c., and allowed to settle the line of demarcation between the clear and clouded parts of the fluid is not below 175 c. c., at the end of 5 minutes, and not below 140 c. c., at the end of 10 minutes.

2. The herein-described dry, soft, white bulky powder essentially acid arsenate of lead ($PbHAsO_4$) distinguished by the fact that when mixed with water in the percentage of 15 grams to a total volume of 250 c. c., the line of demarcation between the clear and clouded parts of the fluid is approximately at 210 c. c. at the end of 5 minutes and approximately at 175 c. c. at the end of 10 minutes.

In testimony whereof I hereunto set my hand this 24th day of February, 1913.

CLARE H. HALL.

In presence of two subscribing witnesses:
D. C. THORSEN,
O. C. AVISUS.

---

Correction in Letters Patent No. 1,064,639.

It is hereby certified that in Letters Patent No. 1,064,639, granted June 10, 1913, upon the application of Clare H. Hall, of Milwaukee, Wisconsin, for an improvement in "Acid Arsenate of Lead," an error appears in the printed specification requiring correction as follows: Page 1, transpose lines 39 and 40; and that the said Letters Patent should be read with this correction therein that the same may conform to the record of the case in the Patent Office.

Signed and sealed this 23rd day of December, A. D., 1913.

[SEAL.]

J. T. NEWTON,
*Acting Commissioner of Patents.* that when mixed with water in the percentage of 15 grams to a total volume of 250 c. c., the line of demarcation between the clear and clouded parts of the fluid is approximately at 210 c. c. at the end of 5 minutes and approximately at 175 c. c. at the end of 10 minutes.

In testimony whereof I hereunto set my hand this 24th day of February, 1913.

CLARE H. HALL.

In presence of two subscribing witnesses:
D. C. THORSEN,
O. C. AVISUS.

Correction in Letters Patent No. 1,064,639.

It is hereby certified that in Letters Patent No. 1,064,639, granted June 10, 1913, upon the application of Clare H. Hall, of Milwaukee, Wisconsin, for an improvement in "Acid Arsenate of Lead," an error appears in the printed specification requiring correction as follows: Page 1, transpose lines 39 and 40; and that the said Letters Patent should be read with this correction therein that the same may conform to the record of the case in the Patent Office.

Signed and sealed this 23rd day of December, A. D., 1913.

[SEAL.]

J. T. NEWTON,
*Acting Commissioner of Patents.*

Correction in Letters Patent No. 1,064,639.

It is hereby certified that in Letters Patent No. 1,064,639, granted June 10, 1913, upon the application of Clare H. Hall, of Milwaukee, Wisconsin, for an improvement in "Acid Arsenate of Lead," an error appears in the printed specification requiring correction as follows: Page 1, transpose lines 39 and 40; and that the said Letters Patent should be read with this correction therein that the same may conform to the record of the case in the Patent Office.

Signed and sealed this 23rd day of December, A. D., 1913.

[SEAL.]

J. T. NEWTON,
*Acting Commissioner of Patents.*